(12) United States Patent
Edmiston

(10) Patent No.: US 8,703,895 B2
(45) Date of Patent: Apr. 22, 2014

(54) IN-SITU METHOD AND SYSTEM FOR CONTROLLING THE FLOW OF AN ORGANIC LIQUID

(76) Inventor: Paul L. Edmiston, Wooster, OH (US)

( * ) Notice: Subject to any disclaimer, the term of this patent is extended or adjusted under 35 U.S.C. 154(b) by 139 days.

(21) Appl. No.: 13/157,274

(22) Filed: Jun. 9, 2011

(65) Prior Publication Data

US 2011/0303296 A1 Dec. 15, 2011

Related U.S. Application Data

(63) Continuation-in-part of application No. 12/819,940, filed on Jun. 21, 2010, now Pat. No. 8,119,759.

(60) Provisional application No. 61/353,472, filed on Jun. 10, 2010.

(51) Int. Cl.
*C08G 77/50* (2006.01)

(52) U.S. Cl.
USPC .......................................................... 528/35

(58) Field of Classification Search
USPC .......................................................... 528/35
See application file for complete search history.

(56) References Cited

FOREIGN PATENT DOCUMENTS

JP    2002 147628    *    5/2002

OTHER PUBLICATIONS

JP 2002 147628 Machine translation (2002).*

* cited by examiner

*Primary Examiner* — Kuo-Liang Peng
(74) *Attorney, Agent, or Firm* — Arent Fox LLP

(57) ABSTRACT

Disclosed is a method and system for controlling the flow of an organic liquid by flowing an organic liquid through a pipe having an upstream end with an unconstricted portion and a downstream end with a constricted portion, the constricted portion having an inner diameter that is at least 10% smaller than the inner diameter of the unconstricted portion, and a porous plug formed of sol-gel derived particles in the pipe, the plug having a length at least two times the diameter of the pipe. Also disclosed is a method and system, the system including a housing having a liquid inlet and a liquid outlet and containing a sol-gel derived composition and a liquid pressure sensitive control means operatively connected to the liquid inlet for controlling the flow of the organic liquid, contacting the sol-gel derived composition to actuate the liquid pressure sensitive control means and controlling the flow of the organic liquid in response to the actuation.

32 Claims, 2 Drawing Sheets

IN-SITU METHOD AND SYSTEM FOR CONTROLLING THE FLOW OF AN ORGANIC LIQUID

CROSS REFERENCE TO RELATED APPLICATION

This present application is a continuation-in-part of U.S. patent application Ser. No. 12/819,940, filed Jun. 21, 2010 which issued as U.S. Pat. No. 8,119,759 on Feb. 21, 2012, which claims priority from U.S. Provisional Appl. No. 61/353,472.

STATEMENT REGARDING FEDERALLY FUNDED RESEARCH OR DEVELOPMENT

This invention was made with Government support under National Science Foundation Grant No. 1947699.

BACKGROUND OF THE INVENTION

1. Field of the Invention

The present invention relates generally to the chemical arts. More particularly, the invention relates to an in-situ method and system for the controlling the flow of an organic liquid.

2. Discussion of the Related Art

Controlling the flow of aqueous fluids in response to dissolved or dispersed organic substances is useful for a variety of applications including, but not limited to: 1) preventing release of contaminated water if such water is flowing into the environment, 2) Controlling process mixtures in manufacturing; 3) Chemically induced valve actuation. Measurement of organic species in water is useful to many fields. Accordingly, there is a definite need for new methods and systems that simply, efficiently and economically meet these needs.

SUMMARY OF THE INVENTION

Now in accordance with the invention there has been found a method and system that meets these needs and provides additional advantages. Disclosed is a method and system for controlling the flow of an organic liquid that includes the step of flowing an organic liquid through a pipe having an upstream end with an unconstricted portion and a downstream end with a constricted portion and a porous plug in the pipe. In some aspects, the constricted portion has an inner diameter that is at least 10% smaller than the inner diameter of the unconstricted portion and the plug has a length at least two times the diameter of the pipe. In some embodiments, the porous plug is contained in a fracturable housing.

In some aspects, the plug is made of a sol-gel derived composition swellable to at least 1.5 times its volume to cause the plug to swell and control the flow of liquid through the downstream end. And in some aspects, the plug is made of particles of an aromatically-bridged, organosiloxane sol-gel derived composition containing a plurality of alkylsiloxy substituents.

In some aspects, the sol-gel derived particles have an irregular shape. And in some aspects, the sol-gel derived particles have a particle size less than or equal to about 1 nm in at least one direction. In some embodiments, the sol-gel derived particles additionally include an embedded organic polymer. And in some of these embodiments, the embedded polymer is polyamine, polystyrene or polyvinylphenol having a molecular weight >1,000 g/mol.

Also disclosed is a method and system that includes flowing an organic liquid through a system made up of a housing having a liquid inlet and a liquid outlet and a liquid pressure sensitive control means operatively connected to the liquid inlet for controlling the flow of the organic liquid, contacting the sol-gel derived composition with the organic liquid to swell the sol-gel derived composition and increase the pressure of the liquid inside the housing to actuate the liquid pressure sensitive control means and controlling the flow of the organic liquid in response to the actuation of the liquid pressure sensitive control means.

In some aspects, the housing contains a sol-gel derived composition swellable to at least 1.5 times its volume. And is some aspects, the housing contains a porous aromatically-bridged, organosiloxane sol-gel derived composition containing a plurality of alkylsiloxy substituents. In some embodiments, the pressure sensitive control means is a pressure sensitive valve and actuation of the pressure sensitive valve causes a change of direction in the flow of organic liquid.

In some aspects, the organic liquid is the only liquid. And in some aspects, the organic liquid forms part of a bi-phasic mixture with water.

In some aspects, the organic solvent is an alkyl hydrocarbon, an aromatic hydrocarbon, a chlorinated hydrocarbon, an alcohol, an aldehyde, an epoxide, a ketone or an organic acid. Such organic solvents include hexane, cyclohexane, octane, decane, octadecane, mineral oil, benzene, toluene, xylene, naphthalene, nitrobenzene, dichloromethane, trichloroethylene, perchloroethylene, dichloroethylene, methanol, ethanol, phenol, m-nitrophenol, methyl-t-butyl ether, acetone, gasoline, crude oil, aviation fuel and motor oil.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE PREFERRED EMBODIMENTS

Figure 1A:
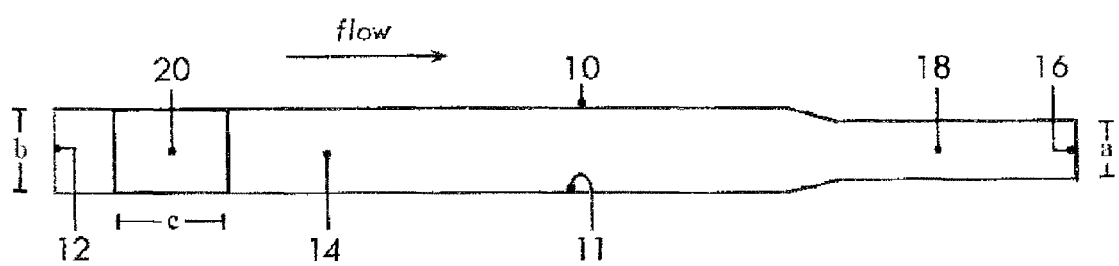
FIG. 1A is an illustration of a system in accordance with the invention where the plug has not been displaced.

Particular embodiments of the invention are described below in detail for the purpose of illustrating its principles and operation. However, various modifications may be made, and the scope of the invention is not limited to the exemplary embodiments described below.

Unless otherwise defined, all technical terms used herein have the same meaning as commonly understood by one of ordinary skill in the art to which the present invention pertains.

As used herein, "swellable" means an increase of at least 1.5 times the volume of the sol-gel derived composition, when placed in excess acetone compared to the volume when dry.

As used herein, "nanoparticle" means a particle sized between about 2 and about 500 nanometers in one dimension.

In accordance with the invention, there has been discovered a novel method and system for controlling the flow of an organic liquid. In some aspects, the method includes the step of flowing an organic liquid through a pipe containing a porous plug made of a sol-gel derived composition (sometimes simply referred to as a sol-gel or a sol-gel derived composition) to cause the plug to swell and control the flow of water through the downstream end of the pipe.

The method is useful in controlling the flow of liquids which are comprised entirely of organic liquids and the flow of liquids which are the combination of the organic liquid and water as a bi-phasic mixture. In some aspects of the invention, when the liquid is comprised entirely of organic liquids, it has a Snyder Index of ≤6.5 and when the organic liquid is part of a bi-phasic mixture it has a log $k_{ow}$>−0.32.

Examples of organic liquids include alkyl hydrocarbons, such as hexane, cyclohexane, octane, decane, octadecane, and mineral oil; aromatic hydrocarbons, such as benzene, toluene, xylene, naphthalene, nitrobenzene; chlorinated hydrocarbons, such as dichloromethane, trichloroethylene, perchloroethylene, dichloroethylene, vinyl chloride and polychlorinated triphenylstibine; alcohols, including both aliphatic alcohols, such as lower alkyl alcohols, including methanol and ethanol, and phenols, including phenol and m-nitrophenol; naphthols; ethers, such as methyl-t-butyl ether; as well as aldehydes; epoxides; and ketones, such as acetone; organic acids, including organic species possessing at least one carboxylic acid group, at least one sulfonic acid group, at least one thiol group, or at least one enol group, sulfinic acids, protonated amines, and hydroxamic acids; acetonitrile and mixtures, such as gasoline, crude oil, aviation fuel and motor oil.

In some aspects, the porous plug is formed of a sol-gel derived composition swellable to at least 1.5 times its volume. Preferred sol-gel derived compositions are swellable to at least two times their original volume, more preferably at least five times their original volume, and in some embodiments up to about eight to ten times their original volume. The swelling of the sol-gel derived composition is driven by the release of stored tensile force rather than by chemical reaction.

And in some aspects, the porous plug is formed of sol-gel derived particles of an aromatically-bridged, organosiloxane sol-gel derived composition containing a plurality of alkylsiloxy substituents. In such embodiments, the sol-gel derived composition contains a plurality of flexibly tethered and interconnected organosiloxane particles having diameters on the nanometer scale. The organosiloxane nanoparticles form a disorganized porous matrix defined by a plurality of cross-linked aromatic siloxanes.

The porous, aromatically bridged, organosiloxane sol-gel derived compositions contains a plurality of polysiloxanes that include an aromatic bridging group flexibly linking the silicon atoms of the polysiloxanes. Such organosiloxane nanoparticles have a multilayer configuration comprising a hydrophilic inner layer and a hydrophobic, aromatic-rich outer layer.

In some embodiments, the sol-gel derived particles have an irregular shape and in some embodiments, the sol-gel derived particles have a particle size less than or equal to about 1 nm in at least one direction. The strength of the barrier created by the swollen plug to prevent further flow of liquid through the pipe can be enhanced by using sol-gel derived particles embedded with organic polymers. Without wishing to be limited to a theory of operation, it is believed that upon swelling, the organic polymers diffuse out of individual sol-gel derived particles and enter neighboring particles leading to molecular-level entanglement of the sol-gel derived particles. The organic polymer is typically included in an amount from about 1% to about 50% w/w and in some embodiments from about 1% to about 50% w/w. Examples of suitable organic polymers include, without limitation polyamine, polystyrene, and polyvinylphenol polymers having a molecular weight >1,000 g/mol. Sol-gels of the present invention are prepared using one or more bridged silane precursors and well-known acid or base conditions, preferably base conditions.

The preparation of sol-gel derived particles is disclosed in U.S. Pat. No. 7,790,830, issued Sep. 7, 2010, which patent is herein incorporated by reference. Sol-gels are prepared using one or more bridged silane precursors and well-known acid or base conditions, preferably base conditions.

The bridged silane precursors are bis(alkoxysilylalkyl)aromatics, preferably those having the structure:

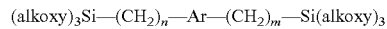

wherein n and m are individually an integer from 1 to 8, preferably 1 to 6, most preferably 1 to 3; Ar is an single-, fused-, or poly-aromatic ring, preferably a phenyl, biphenyl, or naphthyl; and each alkoxy is indendently a C1 to C5 alkoxy, preferably C1 to C3 alkoxy.

Preferred bridged silane precursors are bis(trialkoxysilylalkyl)benzenes. Exemplary precursors include, without limitation, 1,4-bis(trimethoxysilylmethyl)benzene, bis(trimethoxysilylethyl)benzene ("BTEB"), and mixtures thereof. BTEB, in particular, is available as a mixture of stereoisomers.

The bridged silane precursor is preferably present in the reaction medium at between about 0.25M and about 1M, preferably between about 0.4M and about 0.8M, most preferably between about 0.4M and about 0.6M.

Conditions for sol-gel formation are well-known in the art, and include the use of acid or base catalysts in appropriate solvents. As demonstrated in the examples, a number of suitable conditions can be used to form the swellable sol-gel compositions.

Preferred conditions are those that contain a base catalyst in any suitable solvent. Exemplary base catalysts include, without limitation, tetrabutyl ammonium fluoride ("TBAF"), 1,5-diazabicyclo[4.3.0]non-5-ene ("DBN"), and alkylamines (e.g. propyl amine), of which TBAF is preferred. Suitable solvents for use with the base catalysts include, without limitation, tetrahydrofuran ("THF"), acetone, dichloromethane/THF mixtures containing at least 15% by vol. THF, and THF/acetonitrile mixtures containing at least 50% by vol. THF. Of these exemplary solvents, THF is preferred.

As noted above, acid catalysts can be used to form swellable sol-gels, although acid catalysts are less preferred. Exemplary acid catalysts include, without limitation, any strong acid such as hydrochloric acid, phosphoric acid, sulfuric acid, etc. Suitable solvents for use with the acid catalysts include those identified above for use with base catalysts.

After gellation, the material is preferably aged for an amount of time suitable to induce syneresis, which is the shrinkage of the gel that accompanies solvent evaporation. The aging drives off much but not necessarily all of the solvent. While aging times may vary depending upon the catalyst and solvent used to form the gel, aging is typically carried out for about 15 minutes up to about 7 days, preferably from about 1 hour up to about 4 days. Aging can be carried out at room temperature or elevated temperature (i.e. from about 18° C. up to about 60° C.), either in open atmosphere, under reduced pressure, or in a container or oven.

Solvent and catalyst extraction (i.e. rinsing) can be carried out after or during the aging process. Preferred materials for extraction include, without limitation, any organic solvent of medium polarity, e.g. THF, acetone, ethanol, and acetonitrile, either alone or in combination.

After rinsing, the sol-gel is characterized by the presence of residual silanols. The silanol groups allow for derivatization of the gel using any reagent that includes both one or more silanol-reactive groups and one or more non-reactive alkyl groups. The derivatization process results in the end-capping of the silanol-terminated polymers present within the sol-gel.

One suitable class of derivatization reagents includes halosilane reagents that contain at least one halogen group and at least one alkyl group. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and di-iodosilanes. Exemplary halosilanes suitable for use as derivatization reagents include, without limitation, cynanopropyldimethyl-chlorosilane, phenyldimethylchlorosilane, chloromethyldimethylchlorosilane, (trideca-fluoro-1,1,2,2-tertahydro-octyl)imethylchlorosilane, n-octyldimethylchlorosilane, and n-octadecyldimethylchlorosilane. The alkyl grous of the reagent may be any alkyl, and the modifier may contain more than one alkyl group. The alkyl groups, as used herein, can be aliphatic or non-aliphatic hydrocarbons containing up to about 30 carbons, with or without one or more hetero atoms (e.g. S, O, N, P, halo), including straight-chain hydrocarbons, branched-chain hydrocarbons, cyclic hydrocarbons, and aromatic hydrocarbons.

Another suitable class of derivatization reagents includes silazanes or disilazanes. Any silazane with at least one reactive group X and at least one non-reactive R group (alkyl, as defined in the preceding paragraph) can be used. A preferred disilazane is hexamethyldisilazane.

After derivatizing, the derivatized gels are preferably rinsed in any of the rinsing agents described above, and then dried. Drying can be carried out under any suitable conditions, but preferably in an oven, e.g. for about 2 hr at about 60° C.

The dried sol-gel monolith can be crushed/ground into a powdered form. Depending upon the manner in which grinding of the monolith is carried out to obtain the powdered form, the particle sizes may vary widely. A suitable swellable sol-gel derived composition is Osorb® swellable sol-gel derived composition available from ABS Materials, Wooster, Ohio.

Figure 1B:
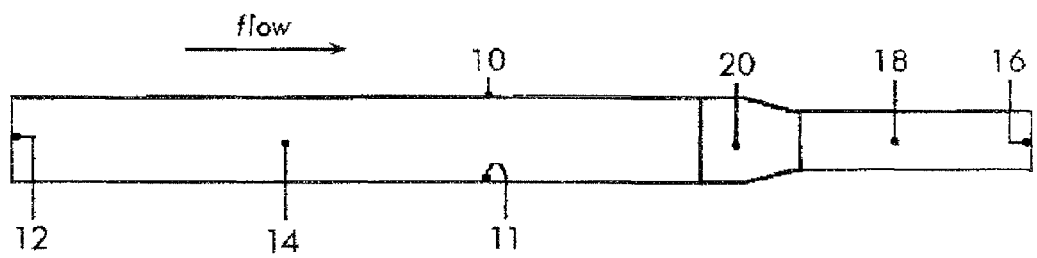
FIG. 1B is an illustration of the system in accordance with the invention where the plug has been displaced.

In the embodiment shown in FIGS. 1A and 1B, a pipe 10 has an inner wall 11, an upstream end 12 with an unconstricted portion 14 and a downstream end 16 with a constricted portion 18. In some aspects, the diameter a of the constricted portion is at least 10% smaller than the diameter b of the unconstricted portion.

A plug 20 is disposed inside the tube. In some aspects, the plug has a length c that is at least two times the diameter b of the unconstricted portion 14. And is some aspects of the invention, the plug is contained in a fracturable housing 22.

When the organic liquid is flowed through the pipe 10, it induces swelling of the plug 20. This causes the plug to exert force on the inside wall 11 of the pipe. In instances of low flow rates and fluid pressures, the force of the swelling may be sufficient to restrict further flow of organic through the system. As seen in FIG. 1B, at higher flows rates and pressures the flow is inhibited when the plug of swollen sol-gel derived particles encounters the constriction point. Control is due to the viscoelastic properties of the sol-gel derived particles, particularly when swollen with organic liquids. When forced through the constriction the partially or fully swollen sol-gel derived particles will compress into a semi-solid preventing further flow beyond the constriction.

Figure 2A:
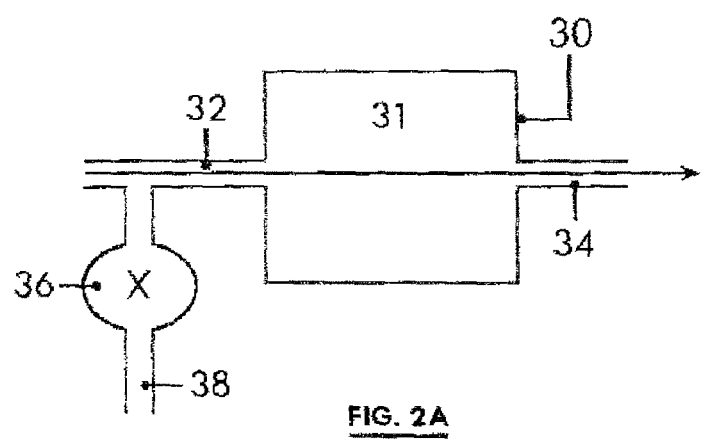
FIG. 2A is an illustration of a second embodiment of a system in accordance with the invention having a liquid pressure sensitive control valve in the closed position.
Figure 2B:
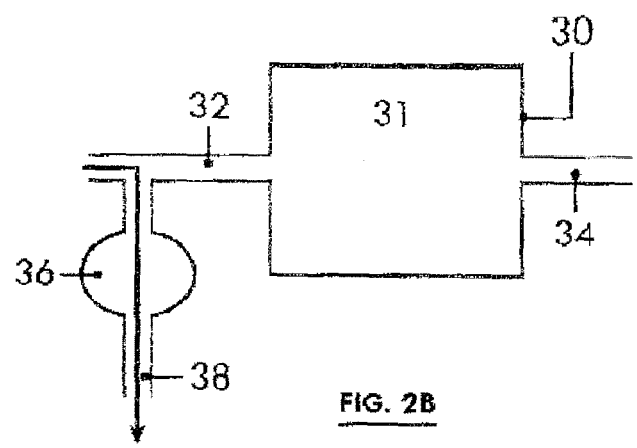
FIG. 2B is an illustration of the second embodiment of a system in accordance with the invention having a liquid pressure sensitive control valve in the open position.

In the embodiment shown in FIGS. 2A and 2B, the organic liquid is flowed through a housing 30 containing the sol-gel derived composition 31. The housing has a liquid inlet 32, a liquid outlet 34 and a liquid pressure sensitive control means 36 operatively connected to the liquid inlet for controlling the flow of the organic liquid. The sol-gel derived composition is contacted with the organic liquid causing the sol-gel derived composition to swell and increase the pressure of the liquid inside the housing. The increase in pressure actuates the liquid pressure sensitive control means and the flow of the organic liquid is controlled in response to the actuation of the liquid pressure sensitive control means.

This embodiment is also useful in controlling the flow of liquids which are comprised entirely of organic liquids and the flow of liquids which are the combination of the organic liquid and water as a bi-phasic mixture. The housing 30 is made of any suitable material, such as stainless steel. It is an advantage of the inventive method that a wide variety of pressure sensitive control means 36 can be used, including, without limitation, a pressure sensitive valves. The pressure sensitive valves can be actuated between an open position, in which the flow of organic liquid is directed through the housing (as shown in FIG. 2B), and a closed position in which the flow of organic liquid is directed through a conduit 38 (as shown in FIG. 2A).

The following example is for the purpose of illustration only and are not intended to limit the scope of the claims, which are appended hereto.

EXAMPLE

A stainless steel tube with a inside diameter of ¼" was bent with a constriction of a dimple on both sides of the bend. Each dimple created a 5% reduction in the inside diameter of the tubing. An amount of fluid (20% transmission fluid, 80% water) was added to the tubing to fill it past the constriction point. This was followed by the addition of 60 g of sol-gel derived particles composed of 80% unmodified sol-gel derived particles and 20% sol-gel derived particles embedded with 5% w/w polyamine. The remaining volume of the tube was filled with fluid (20% transmission fluid, 80% water). Flow was created by pumping fluid via a high pressure liquid chromatography pump a the direction that would cause the sol-gel derived particles material to travel toward the constriction. When the sol-gel derived particles plug encountered the constriction flow ceased. No flow could be induced even at pressures up to 6,000 psi. Restriction of the flow was independent of initial flow rate.

From the above description of the invention, those skilled in the art will perceive improvements, changes and modifications. Such improvements, changes, and modifications are within the skill of the art and are intended to be covered by the appended claims.

I claim:
1. A method for controlling the flow of an organic liquid comprising:
flowing an organic liquid through a pipe having an upstream end with an unconstructed portion and a downstream end with a constricted portion, the constricted portion having an inner diameter that is at least 10% smaller than the inner diameter of the unconstructed portion, and a porous plug in the pipe, the plug having a length at least two times the diameter of the pipe, the plug comprising a sol-gel derived composition swellable to at least 1.5 times its volume to cause the plug to swell and control the flow of liquid through the downstream end.

2. The method of claim 1 where the organic solvent is an alkyl hydrocarbon, an aromatic hydrocarbon, a chlorinated hydrocarbon, an alcohol, an aldehyde, an epoxide, a ketone or an organic acid.

3. The method of claim 2 where the organic solvent is hexane, cyclohexane, octane, decane, octadecane, mineral oil, benzene, toluene, xylene, naphthalene, nitrobenzene, dichloromethane, trichloroethylene, perchloroethylene, dichloroethylene, methanol, ethanol, phenol, m-nitrophenol, methyl-t-butyl ether, acetone, gasoline, crude oil, aviation fuel or motor oil.

4. The method of claim 1 wherein the organic liquid is the only liquid.

5. The method of claim 1 wherein is organic liquid forms part of a bi-phasic mixture with water.

6. The method of claim 1 wherein the sol-gel derived composition comprises sol-gel derived particles having an irregular shape.

7. The method of claim 1 wherein the sol-gel derived composition comprises sol-gel derived particles having an irregular shape and having a particle size less than or equal to about 1 nm in at least one direction.

8. The method of claim 1 wherein the sol-gel derived composition comprises sol-gel derived particles having an irregular shape and further comprising an embedded organic polymer.

9. The method of claim 8 wherein the embedded polymer is polyamine, polystyrene or polyvinylphenol having a molecular weight >1,000 g/mol.

10. The method of claim 1 wherein the porous plug is contained in a fracturable housing.

11. A method for controlling the flow of an organic liquid comprising:
flowing an organic liquid through a pipe having an upstream end with an unconstricted portion and a downstream end with a constricted portion, the constricted portion having an inner diameter that is at least 10% smaller than the inner diameter of the unconstricted portion, and a porous plug in the pipe, the plug having a length at least two times the diameter of the pipe, the plug comprising particles of an aromatically-bridged, organosiloxane sol-gel derived composition containing a plurality of alkylsiloxy substituents to cause the plug to swell and control the flow of liquid through the downstream end.

12. The method of claim 11 where the organic solvent is an alkyl hydrocarbon, an aromatic hydrocarbon, a chlorinated hydrocarbon, an alcohol, an aldehyde, an epoxide, a ketone or an organic acid.

13. The method of claim 11 where the organic solvent is hexane, cyclohexane, octane, decane, octadecane, mineral oil, benzene, toluene, xylene, naphthalene, nitrobenzene, dichloromethane, trichloroethylene, perchloroethylene, dichloroethylene methanol, ethanol, phenol, m-nitrophenol, methyl-t-butyl ether, acetone, gasoline, crude oil, aviation fuel or motor oil.

14. The method of claim 11 wherein the organic liquid is the only liquid.

15. The method of claim 11 wherein is organic liquid forms part of a bi-phasic mixture with water.

16. The method of claim 11 wherein the sol-gel derived composition comprises sol-gel derived particles having an irregular shape.

17. The method of claim 11 wherein the sol-gel derived composition comprises sol-gel derived particles having an irregular shape and having a particle size less than or equal to about 1 nm in at least one direction.

18. The method of claim 11 wherein the sol-gel derived composition comprises sol-gel derived particles having an irregular shape and further comprising an embedded organic polymer.

19. The method of claim 18 wherein the embedded polymer is polyamine, polystyrene or polyvinylphenol having a molecular weight >1,000 g/mol.

20. The method of claim 11 wherein the porous plug is contained in a fracturable housing.

21. A system for controlling the flow of an organic liquid comprising:
a pipe having an upstream end with an unconstricted portion and a downstream end with a constricted portion, the constricted portion having an inner diameter that is at least 10% smaller than the inner diameter of the unconstricted portion, and
a porous plug in the pipe, the plug having a length at least two times the diameter of the pipe, the plug comprising a swellable, sol-gel derived particles.

22. The system of claim 21 wherein the sol-gel derived particles have an irregular shape.

23. The system of claim 21 wherein the sol-gel derived particles have a particle size less than or equal to about 1 nm in at least one direction.

24. The system of claim 21 wherein the sol-gel derived particles further comprise an embedded organic polymer.

25. The system of claim 24 wherein the embedded polymer is polyamine, polystyrene or polyvinylphenol having a molecular weight >1,000 g/mol.

26. The system of claim 21 wherein the porous plug is contained in a fracturable housing.

27. A system for controlling the flow of an organic liquid comprising:
a pipe having an upstream end with an unconstricted portion and a downstream end with a constricted portion, the constricted portion having an inner diameter that is at least 10% smaller than the inner diameter of the unconstricted portion; and
a porous plug in the pipe, the plug having a length at least two times the diameter of the pipe, the plug comprising particles of an aromatically-bridged, organosiloxane sol-gel derived composition containing a plurality of alkylsiloxy substituents.

28. The system of claim 27 wherein the sol-gel derived composition comprises sol-gel derived particles having an irregular shape.

29. The system of claim 27 wherein the sol-gel derived composition comprises sol-gel derived particles having an irregular shape and having a particle size less than or equal to about 1 nm in at least one direction.

30. The system of claim 27 wherein the sol-gel derived composition comprises sol-gel derived particles having an irregular shape and further comprising an embedded organic polymer.

31. The system of claim 28 wherein the embedded polymer is polyamine, polystyrene or polyvinylphenol having a molecular weight >1,000 g/mol.

32. The system of claim 27 wherein the porous plug is contained in a fracturable housing.

* * * * *